US008507141B2

(12) United States Patent
Lang et al.

(10) Patent No.: US 8,507,141 B2
(45) Date of Patent: Aug. 13, 2013

(54) MEMBRANE PERMEATION ADJUSTMENT IN PEM FUEL CELL

(75) Inventors: Matthew A. Lang, Churchville, NY (US); Daniel C. Di Fiore, Scottsburg, NY (US); William H. Pettit, Rochester, NY (US); Steven R. Falta, Honeoye Falls, NY (US); John C. Fagley, Victor, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 28 days.

(21) Appl. No.: 12/868,487

(22) Filed: Aug. 25, 2010

(65) Prior Publication Data

US 2012/0052408 A1 Mar. 1, 2012

(51) Int. Cl.
*H01M 8/04* (2006.01)

(52) U.S. Cl.
USPC ........... 429/429; 429/431; 429/443; 429/444; 429/448

(58) Field of Classification Search
USPC .................. 429/431, 443, 444, 448, 429
See application file for complete search history.

(56) References Cited

U.S. PATENT DOCUMENTS

| 7,829,233 | B2* | 11/2010 | Kizaki ............................ 429/443 |
| 2006/0110640 | A1* | 5/2006 | Yoshida et al. .................. 429/25 |
| 2008/0145720 | A1* | 6/2008 | Sinha et al. ..................... 429/13 |
| 2009/0202877 | A1* | 8/2009 | Tezuka et al. ................... 429/22 |
| 2010/0151284 | A1* | 6/2010 | Burch et al. ..................... 429/13 |

* cited by examiner

*Primary Examiner* — Patrick Ryan
*Assistant Examiner* — Alex Usyatinsky
(74) *Attorney, Agent, or Firm* — John A. Miller; Miller IP Group, PLC

(57) ABSTRACT

A system and method for correcting an estimation of nitrogen in an anode side of a fuel cell stack. The system includes a fuel cell stack and a pressure sensor for measuring pressure in an anode sub-system. The system also includes a controller configured to control the estimation of nitrogen permeation from the cathode side to the anode side of the stack, where the controller determines if the pressure in the anode sub-system equilibrates with atmospheric pressure in a shorter period of time after shutdown compared to the time necessary for the anode sub-system to reach approximately atmospheric pressure after a previous shutdown or calibrated time value, and corrects the estimation of nitrogen in the anode side of the stack if the pressure equilibrates in a shorter period of time.

20 Claims, 3 Drawing Sheets

MEMBRANE PERMEATION ADJUSTMENT IN PEM FUEL CELL

BACKGROUND OF THE INVENTION

1. Field of the Invention

This invention relates generally to a system and method for determining a change in the permeation rate of a membrane in a fuel cell and, more particularly, to a system and method for determining a change in the permeation rate of the membranes in a fuel cell stack and correcting an estimation of nitrogen in an anode sub-system based on the change in the permeation rate of the membranes.

2. Discussion of the Related Art

Hydrogen is a very attractive fuel because it is renewable and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free hydrogen protons and electrons. The hydrogen protons pass through the electrolyte to the cathode. The hydrogen protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell type for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs require adequate fuel supply and humidification for effective operation.

Several fuel cells are typically combined in a fuel cell stack to generate the desired power. The fuel cell stack receives a cathode input gas, typically a flow of air forced through the stack by a compressor. Not all of the oxygen is consumed by the stack and some of the air is output as a cathode exhaust gas that may include water as a stack by-product. The fuel cell stack also receives an anode hydrogen input gas that flows into the anode side of the stack.

A fuel cell stack typically includes a series of bipolar plates positioned between the several MEAs in the stack, where the bipolar plates and the MEAs are positioned between two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

The MEAs are permeable and thus allow nitrogen in the air from the cathode side of the stack to permeate therethrough and collect in the anode side of the stack, often referred to as nitrogen cross-over. Even though the anode side pressure may be slightly higher than the cathode side pressure, cathode side partial pressures will cause oxygen and nitrogen to permeate through the membrane. The permeated oxygen combusts in the presence of the anode catalyst, but the permeated nitrogen in the anode side of the fuel cell stack dilutes the hydrogen. If the nitrogen concentration increases above a certain percentage, such as 50%, fuel cells in the stack may become starved of hydrogen. If the anode becomes hydrogen starved, the fuel cell stack will fail to produce adequate electrical power and may suffer damage to the electrodes in the fuel cell stack.

It is known in the art to provide a bleed valve at the anode exhaust gas output of a fuel cell stack to remove nitrogen from the anode side of the stack. It is also known in the art to estimate the molar fraction of nitrogen in the anode side using a model to determine when to perform the bleed of the anode side or anode sub-system. However, the model estimation may contain errors, particularly as degradation of the components in the fuel cell system occurs over time. If the anode nitrogen molar fraction estimation is significantly higher than the actual nitrogen molar fraction, the fuel cell system will vent more anode gas than is necessary, i.e., will waste fuel. If the anode nitrogen molar fraction estimation is significantly lower than the actual nitrogen molar fraction, the system will not vent enough anode gas and may starve the fuel cells of reactants, which may damage the electrodes in the fuel cell stack.

Therefore, there is a need in the art to determine changes in fuel cell membrane permeation and incorporate the detected change in membrane permeation into a model for estimating the nitrogen flow rate from the cathode to the anode side of the stack and the concentration of nitrogen in the anode side to efficiently utilize anode fuel and to avoid anode reactant starvation events from increasing in frequency as the membranes age.

SUMMARY OF THE INVENTION

In accordance with the teachings of the present invention, a system and method for correcting an estimation of nitrogen in an anode side of a fuel cell stack are disclosed. The system includes a fuel cell stack and a pressure sensor for measuring pressure in an anode sub-system. The system also includes a controller configured to control the estimation of nitrogen in the anode side of the stack by means of nitrogen permeation adjustment, where the controller determines if the pressure in the anode sub-system equilibrates with atmospheric pressure in a shorter period of time after shutdown compared to the time necessary for the anode sub-system to reach approximately atmospheric pressure after a previous shutdown or calibrated time value, and corrects the estimation of nitrogen in the anode side if the pressure equilibrates in a shorter period of time.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for preventing anode starvation by detecting changes in membrane permeation of the membranes in a fuel cell stack is merely exemplary in nature, and is in no way intended to limit the invention or its applications or uses.

Figure 1:
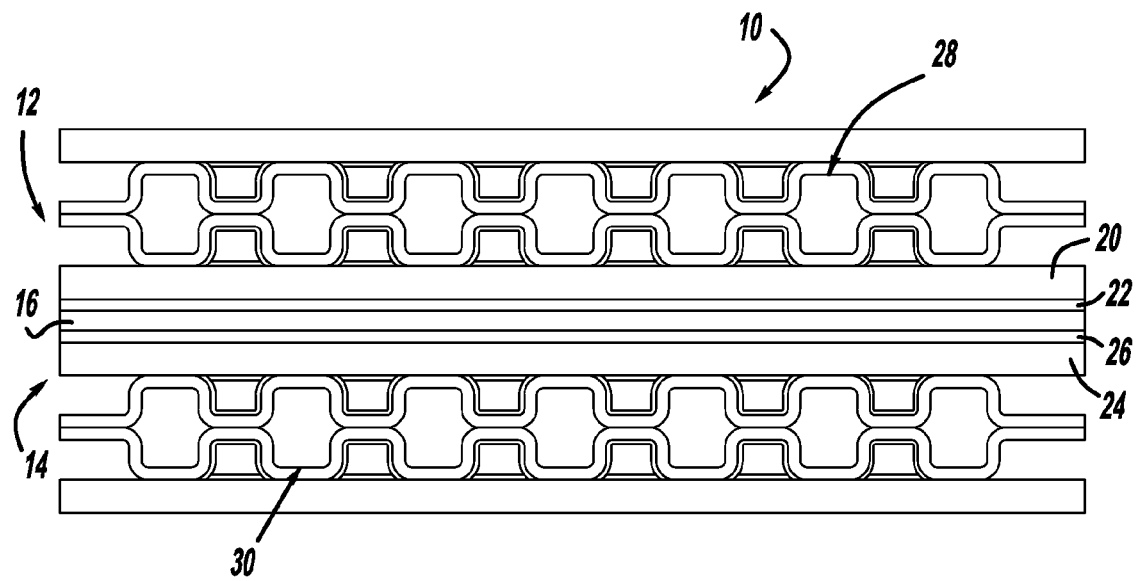
FIG. 1 is a cross-sectional view of a fuel cell.

FIG. 1 is a cross-sectional view of a fuel cell 10 that is part of a fuel cell stack of the type discussed below. The fuel cell 10 includes a cathode side 12 and an anode side 14 separated by a perfluorosulfonic acid membrane 16. A cathode side diffusion media layer 20 is provided on the cathode side 12, and a cathode side catalyst layer 22 is provided between the membrane 16 and the diffusion media layer 20. Likewise, an anode side diffusion media layer 24 is provided on the anode side 14, and an anode side catalyst layer 26 is provided between the membrane 16 and the diffusion media layer 24. The catalyst layers 22 and 26 and the membrane 16 define an MEA. The diffusion media layers 20 and 24 are porous layers that provide for input gas transport to and water transport from the MEA. A cathode side flow field plate or bipolar plate 28 is provided on the cathode side 12, and an anode side flow field plate or bipolar plate 30 is provided on the anode side 14.

Figure 2:
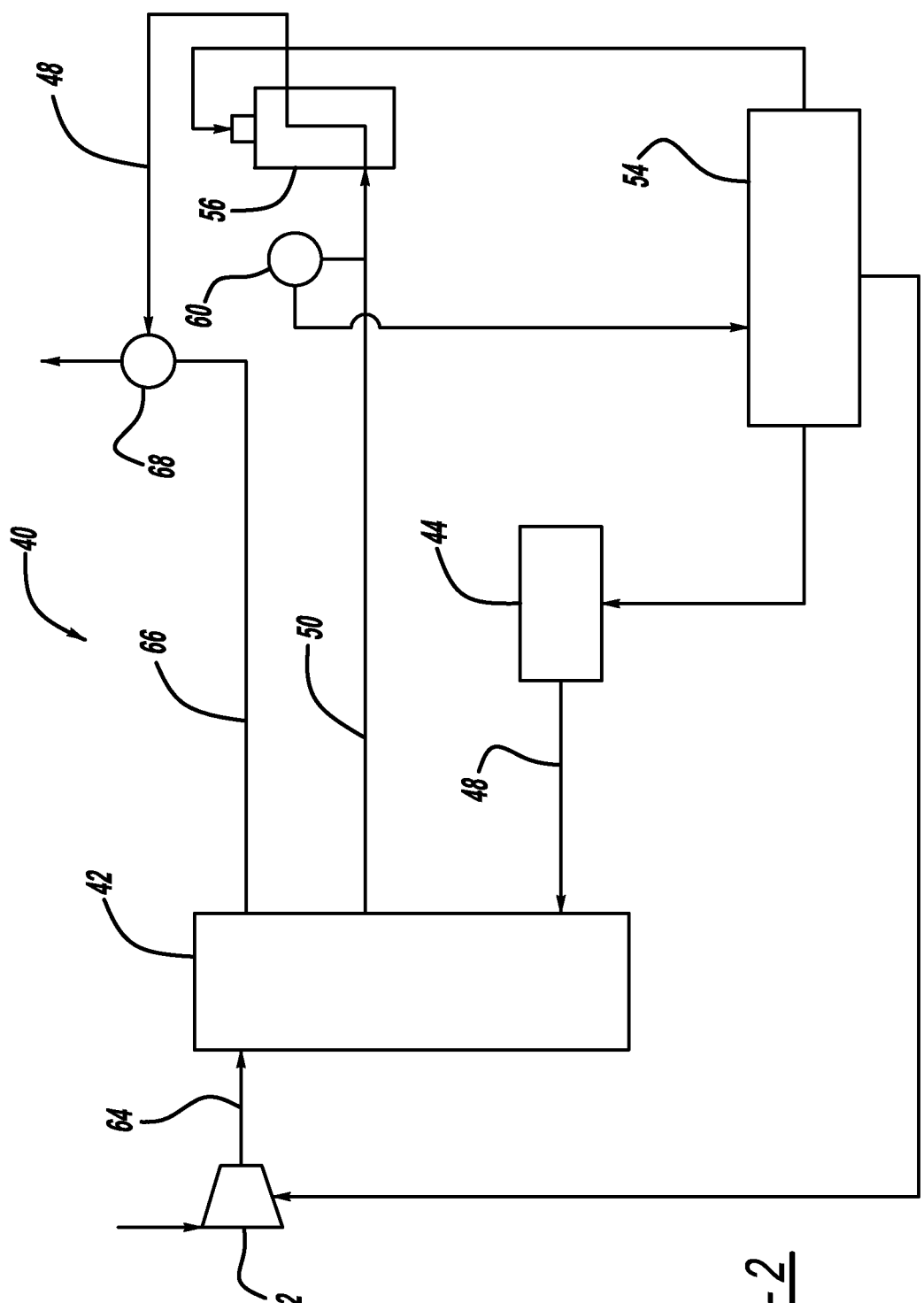
FIG. 2 is a simplified block diagram of a fuel cell system.

FIG. 2 is a simplified block diagram of a fuel cell system 40 including a fuel cell stack 42. The fuel cell system 40 is intended to generally represent any type of fuel cell system that requires an anode exhaust gas bleed to remove nitrogen from the anode side of the stack 42. Examples of such fuel cell systems include fuel cell systems that re-circulate the anode exhaust gas back to the anode inlet and fuel cell systems that employ a split stack design with anode flow-shifting, both of which are referred to herein as an "anode sub-system." Hydrogen gas from a hydrogen source 44 is provided to the anode side of the fuel cell stack 42 on line 48. An anode exhaust gas is output from the fuel cell stack 42 on line 50 and is sent to a bleed valve 56.

As discussed above, nitrogen cross-over from the cathode side of the fuel cell stack 42 dilutes the hydrogen in the anode side of the stack 42, thereby affecting fuel cell stack performance. Therefore, it is necessary to periodically bleed the anode exhaust gas from the anode sub-system using the bleed valve 56 to reduce the amount of nitrogen in the anode sub-system, i.e., in the anode side of the fuel cell stack 42. When the bleed valve 56 is open, the bled anode exhaust gas flows through a bleed line 48. A pressure sensor 60 is also provided in the line 50 to measure the pressure of the anode sub-system of the fuel cell system 40.

Air from a compressor 62 is provided to the cathode side of the fuel cell stack 42 on line 64. A cathode exhaust gas is output from the fuel cell stack 42 on a cathode exhaust gas line 66. A mixing device 68 is provided in the line 66 for mixing the cathode exhaust gas and the bled anode exhaust gas on the line 48.

A controller 54 monitors the pressure of the anode sub-system of the fuel cell system 40, as measured by the pressure sensor 60, controls the speed of the compressor 62, controls the injection of hydrogen from the hydrogen source 44 to the anode side of the stack 42, and controls the position of the anode bleed valve 56, as is discussed in more detail below. The controller 54 also utilizes a model to estimate the permeation flow rate of nitrogen from the cathode side to the anode side and the concentration of nitrogen in the anode side of the stack 42, and to determine when to bleed nitrogen from the anode side of the stack 42. In addition, the controller 54 measures the length of time required for the anode sub-system to reach atmospheric pressure after the fuel cell system 40 has been shutdown. The controller 54 may adjust the cathode to anode nitrogen permeation estimation through the stack 42 based on the time necessary for the anode side to reach atmospheric pressure, as discussed in more detail below.

During normal operation of the fuel cell system 40, nitrogen from the cathode side of the stack 42 permeates through the membranes in the fuel cells to the anode side of the stack 42, which dilutes the fuel concentration in the anode side of the stack 42. Thus, to achieve stable operation of the fuel cells, the nitrogen concentration in the anode side of the fuel cell stack 42 needs to be estimated and controlled. Over time, the permeation rate of the membrane 16 changes due to thinning and other physical changes of the membrane 16, causing the rate of permeation of nitrogen through the membrane 16 to change. Therefore, the change in the rate of permeation of nitrogen through the membrane 16 needs to be periodically determined and accounted for in the estimation of nitrogen concentration in the anode side of the stack 42 to avoid estimating an incorrect level of anode concentration, as is described in more detail below.

To determine changes in the rate of permeation of the membrane 16, the pressure profile of the anode side of the stack 42 after shutdown of the fuel cell system 40 can be used. During a normal shutdown, the cathode side of the stack 42 is depleted of oxygen, causing high levels of nitrogen and low levels of hydrogen at atmospheric pressure. The cathode side is at atmospheric pressure because the cathode side of the stack 42 is not sealed, as is known to those skilled in the art. The anode side of the stack 42, however, is sealed and is left sealed at system shutdown, thus the anode side of the fuel cell stack 42 has a pressurized mixture of a known amount of hydrogen and nitrogen. When the fuel cell system 40 enters the off state, or is shutdown, hydrogen in the anode side of the stack 42 will rapidly diffuse through the membrane 16 into the cathode side of the stack 42 until the hydrogen partial pressure has equilibrated across the membrane 16. This will cause a decrease in pressure in the anode side of the fuel cell stack 42, as measured by the pressure sensor 60. The decrease in pressure in the anode side of the stack 42 will typically create a vacuum as hydrogen rapidly permeates to the cathode side of the stack 42.

Nitrogen has a lower permeation rate than hydrogen through the membrane 16 due to the larger size of the nitrogen molecules compared to the hydrogen molecules. Thus, nitrogen will permeate through the membrane 16 at a slower rate than the hydrogen, causing the pressure in the anode side of the fuel cell stack 42 to increase until the nitrogen partial pressures equilibrate across the membrane 16. Because of the difference in permeation rate between hydrogen and nitrogen, the resulting pressure trajectory of the anode side of the stack 42 after each shutdown, as measured by the pressure sensor 60, can be correlated to changes in the permeation rate of the membranes of the fuel cells in the stack 42.

Figure 3:
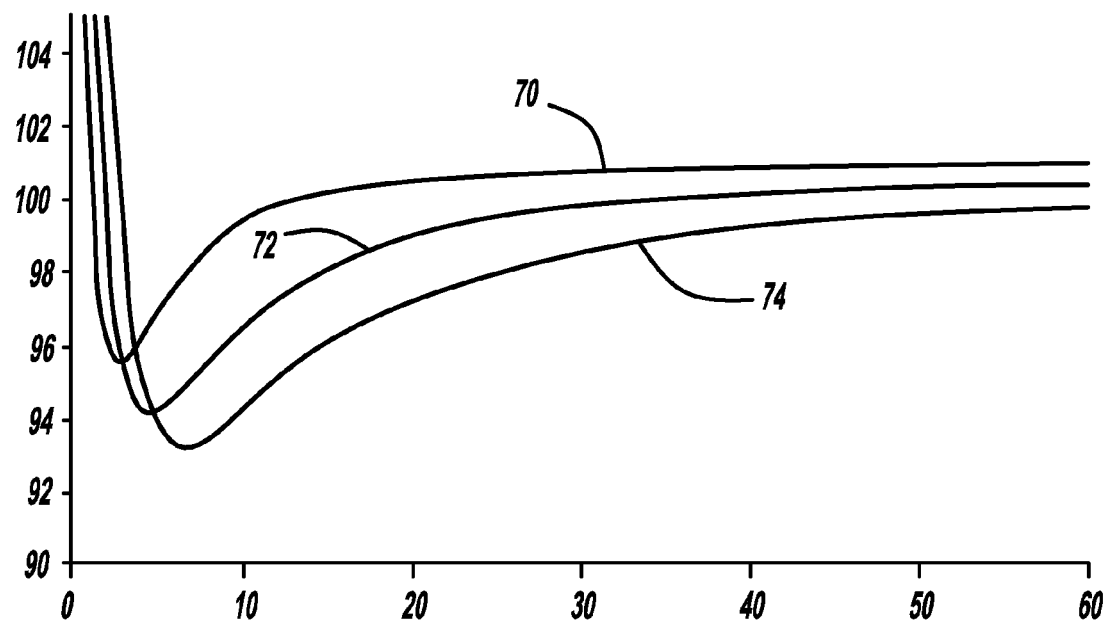
FIG. 3 is a graph with time on the x-axis and anode pressure on the y-axis, illustrating how membrane thickness impacts the anode pressure trajectory over time.

The faster the hydrogen pressure and the nitrogen pressure in the anode side of the stack 42 equilibrate, as measured by the pressure sensor 60, the higher the rate of permeation of the membranes. FIG. 3 is a graph with shutdown time in minutes on the x-axis and anode pressure in kPa on the y-axis, which illustrates the impact of membrane thickness on anode pressure at shutdown of the fuel cell system 40. As shown in FIG. 3, line 70 illustrates the change in pressure over time of a membrane that is 6 μm thick, line 72 illustrates the change in pressure over time of a membrane that is 12 μm thick, and line 74 illustrates the change in pressure over time of a membrane that is 18 μm thick. FIG. 3 illustrates that the pressure equilibrium over time after shutdown, i.e., how long the anode side takes of the stack 42 takes to reach atmospheric pressure, is directly related to the thickness of the membrane 16, indicating that membrane permeation can be estimated using the anode pressure trajectory of a fuel cell system 40 after a typical shutdown of the system 40. The correlation between the thickness of the membrane 16 and the pressure changes in the anode sub-system may be used by an adaptive controller, such as the controller 54, to adapt the estimation of nitrogen concentration in the anode side to changes in membrane permeation, allowing for the anode fuel concentration to be accurately estimated over the life of the fuel cell stack 42. A better estimation of fuel concentration allows for improved efficiency, performance and durability.

Figure 4:
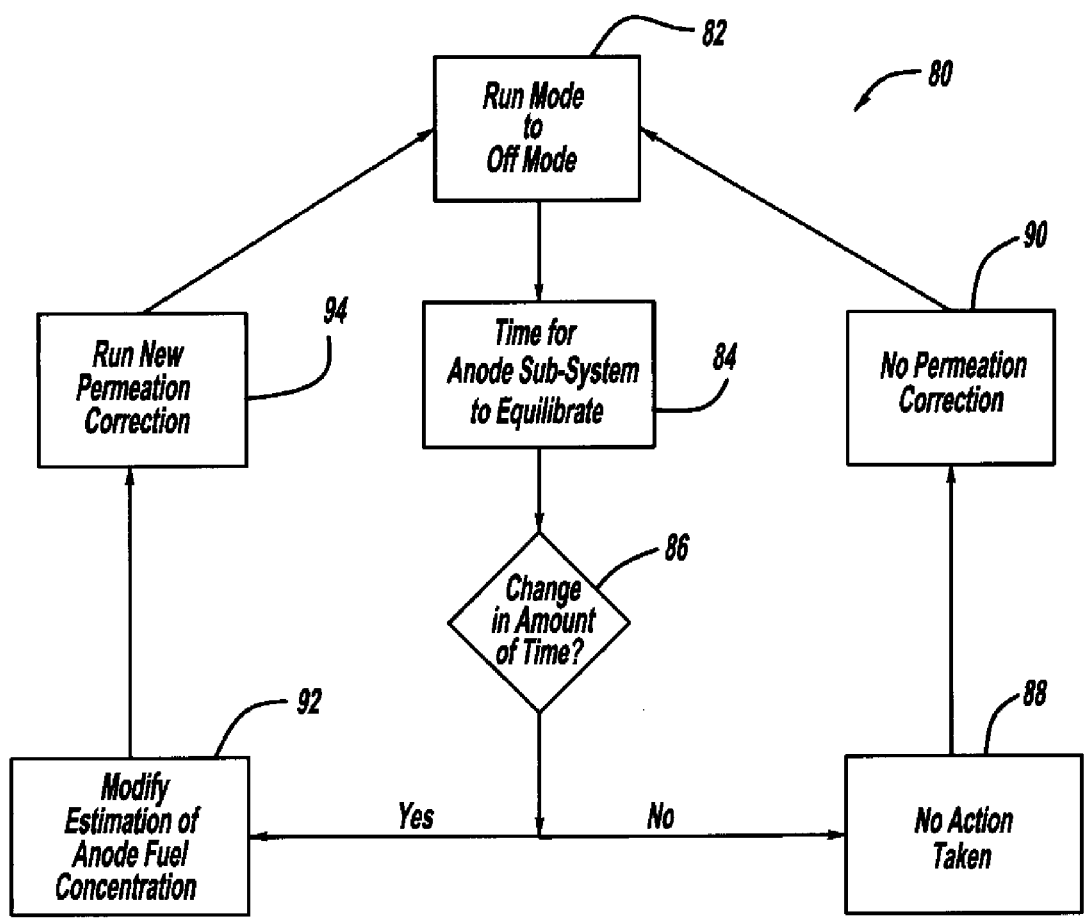
FIG. 4 is a flow chart diagram of an algorithm for determining changes in anode pressure and adjusting a model estimation of nitrogen in the anode side of a fuel cell stack.

FIG. 4 is a flow chart diagram 80 for an algorithm for detecting changes in the permeation rate of the membranes 16 in the stack 42. At box 82, the fuel cell system 40 transitions from run mode to off mode, i.e., is shutdown. After the fuel cell system 40 transitions to off mode at the box 82, the algorithm records the amount of time it takes for the pressure in the anode sub-system to equilibrate with atmospheric pressure, or the pressure of the cathode sub-system, at box 84. Next, the algorithm determines if the amount of time necessary for the pressure in the anode sub-system to equilibrate has changed since the last shutdown, or has changed from a calibrated value, at decision diamond 86. If no change in time has occurred, then the algorithm does not take any action at box 88. The fuel cell system 40 will operate without a permeation correction at box 90 and will return to the box 82 when the fuel cell system 40 transitions from run mode to off mode.

If a change in the amount of time it takes for the pressure in the anode sub-system to equilibrate with atmospheric pressure is detected at the decision diamond 86, then the algorithm will modify the estimation of anode fuel concentration and/or modify the nitrogen bleed schedule in proportion to the change in the permeation rate of the membrane 16, as determined by the change in time, at box 92, and the fuel cell system 40 will run with the new permeation correction to the fuel estimation and/or nitrogen bleed schedule at box 94. For example, the frequency of performing anode bleeds to remove nitrogen from the anode side using the bleed valve 56 may be increased, the duration of the anode bleeds using the bleed valve 56 may be increased, and/or the flow of anode fuel to the stack may be increased. After making the appropriate modification at the box 92 and operating with the new modification at the box 94, the algorithm will return to the box 82 when the fuel cell system 40 transitions from run mode to off mode.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for correcting an estimation of nitrogen in an anode side of a fuel cell stack, said method comprising:
   estimating an amount of nitrogen in the anode side of the fuel cell stack using a model;
   shutting down the fuel cell stack;
   continuously measuring the pressure of an anode sub-system after shutdown of the fuel cell stack until the pressure in the anode sub-system is at approximately atmospheric pressure;
   determining if the pressure of the anode sub-system has reached approximately atmospheric pressure at a faster rate than the time necessary for the anode sub-system to reach approximately atmospheric pressure after a previous shutdown or calibrated time value; and
   correcting the estimation of nitrogen in the anode side of the stack if the pressure in the anode sub-system reached approximately atmospheric pressure at a faster rate than the previous shutdown or calibrated time value, wherein the correction of the estimation of nitrogen is proportional to the difference in time required for the anode sub-system to reach atmospheric pressure compared to the previous shutdown or calibrated time value.

2. The method according to claim 1 wherein determining if the anode sub-system has reached approximately atmospheric pressure at a faster rate than a previous shutdown or calibrated value includes determining if the anode sub-system has reached approximately atmospheric pressure at a faster rate than the calibrated time value when no previous shutdown data is available.

3. The method according to claim 1 wherein determining if the anode sub-system has reached approximately atmospheric pressure at a faster rate than a previous shutdown includes determining if the anode sub-system has reached approximately the same pressure of the cathode side of the stack at a faster rate than the previous shutdown or calibrated time value.

4. The method according to claim 1 further comprising increasing a frequency of bleeding nitrogen from the anode side of the stack if the anode sub-system has reached approximately atmospheric pressure at a faster rate than the previous shutdown or calibrated time value.

5. The method according to claim 1 further comprising increasing a duration of bleeding nitrogen from the anode side of the stack if the anode sub-system has reached approximately atmospheric pressure at a faster rate than the previous shutdown or calibrated time value.

6. The method according to claim 1 wherein continuously measuring the pressure of the anode sub-system includes measuring a pressure below atmospheric pressure before the anode sub-system equilibrates at approximately atmospheric pressure.

7. A method for correcting an estimation of nitrogen in a fuel cell stack, said method comprising:
   continuously measuring the pressure of an anode sub-system after shutdown of the fuel cell stack;
   determining if the pressure of the anode sub-system has reached approximately atmospheric pressure at a faster rate than the time necessary for the anode sub-system to reach approximately atmospheric pressure after a previous shutdown or calibrated time value; and
   correcting the estimation of nitrogen in the anode side of the stack if the pressure in the anode sub-system has reached approximately atmospheric pressure at a faster rate than the previous shutdown or calibrated time value.

8. The method according to claim 7 wherein correcting the estimation of nitrogen in the anode side of the stack includes adjusting the estimation of nitrogen in the anode side of the stack in proportion to the change in time required for the pressure of the anode sub-system to reach approximately atmospheric pressure.

9. The method according to claim 7 wherein determining if the anode sub-system has reached approximately atmospheric pressure at a faster rate than a previous shutdown includes determining if the anode sub-system has reached approximately atmospheric pressure at a faster rate than the calibrated time value when no previous shutdown data is available.

10. The method according to claim 7 wherein determining if the anode sub-system has reached atmospheric pressure at a faster rate than a previous shutdown includes determining if the anode sub-system has reached approximately the same pressure of the cathode side of the stack at a faster rate than the previous shutdown or calibrated time value.

11. The method according to claim 7 further comprising increasing a frequency of bleeding nitrogen from the anode side of the stack if the anode sub-system has reached approximately atmospheric pressure at a faster rate than the previous shutdown or calibrated time value.

12. The method according to claim 7 further comprising increasing a duration of bleeding nitrogen from the anode side of the stack if the anode sub-system has reached approximately atmospheric pressure at a faster rate than the previous shutdown or calibrated time value.

13. The method according to claim 7 wherein continuously measuring the pressure of the anode sub-system includes measuring a pressure below atmospheric pressure before the anode sub-system equilibrates at approximately atmospheric pressure.

14. A system for correcting an estimation of nitrogen in an anode side of a fuel cell stack, said system comprising:
the fuel cell stack having an anode side and a cathode side;
a pressure sensor for measuring pressure in an anode sub-system of a fuel cell system; and
a controller programmed to control the estimation of nitrogen in the anode side of the stack, said controller determining if the pressure in the anode sub-system equilibrates with atmospheric pressure in a shorter period of time after shutdown compared to the time necessary for the anode sub-system to reach approximately atmospheric pressure after a previous shutdown or calibrated time value, and correcting the estimation of nitrogen in the anode side of the stack if the pressure in the anode sub-system equilibrates with atmospheric pressure in a shorter period of time compared to the previous shutdown or calibrated time value.

15. The system according to claim 14 further comprising the controller determines if the anode sub-system has reached approximately atmospheric pressure at a faster rate than the calibrated time value when no previous shutdown data is available.

16. The system according to claim 14 further comprising the controller determines if the anode sub-system has reached approximately the same pressure as the cathode side of the stack at a faster rate than the time necessary for the anode sub-system to reach approximately atmospheric pressure after the previous shutdown or calibrated time value.

17. The system according to claim 14 further comprising a bleed valve for bleeding nitrogen from the anode side of the stack, said controller increasing a frequency of opening and closing the bleed valve if the anode sub-system has reached approximately atmospheric pressure at a faster rate than the previous shutdown or calibrated time value.

18. The system according to claim 14 further comprising a bleed valve for bleeding nitrogen from the anode side of the stack, said controller increasing a duration of opening the bleed valve if the anode sub-system has reached approximately atmospheric pressure at a faster rate than the previous shutdown or calibrated time value.

19. The system according to claim 14 further comprising the controller corrects the estimation of nitrogen in proportion to a change in time required for the pressure in the anode sub-system to reach approximately atmospheric pressure if the anode sub-system has reached approximately atmospheric pressure at a faster rate than the previous shutdown or calibrated time value.

20. The system according to claim 14 further comprising the controller determines if the pressure in the anode sub-system equilibrates with atmospheric pressure after the pressure sensor measures a pressure below atmospheric pressure in the anode sub-system.

* * * * *